United States Patent [19]

Aubert

[11] 4,134,789
[45] Jan. 16, 1979

[54] METHOD FOR REFUELLING A NUCLEAR REACTOR AND DEVICE FOR CARRYING OUT SAID METHOD

[75] Inventor: Gilles Aubert, Orsay, France

[73] Assignee: Commissariat a l'Energie Atomique, Paris, France

[21] Appl. No.: 764,982

[22] Filed: Feb. 2, 1977

Related U.S. Application Data

[63] Continuation of Ser. No. 552,922, Feb. 25, 1975, abandoned.

[30] Foreign Application Priority Data

Mar. 1, 1974 [FR] France .................................. 74 07077

[51] Int. Cl.² ............................................. G21C 19/20
[52] U.S. Cl. .................................................... 176/30
[58] Field of Search ....................... 176/30, 31, 32, 35, 176/36; 214/18 N; 294/86 A

[56] References Cited

U.S. PATENT DOCUMENTS

| | | | |
|---|---|---|---|
| B 367,621 | 2/1976 | Frisch et al. | 176/36 R |
| 3,607,629 | 9/1971 | Frisch et al. | 176/36 R |
| 3,691,011 | 9/1972 | Kruger et al. | 176/30 |
| 3,715,629 | 2/1973 | Mehren | 176/36 R |
| 3,733,250 | 5/1973 | Van Santen et al. | 176/30 |
| 3,766,006 | 10/1973 | Frisch et al. | 176/36 R |
| 3,775,246 | 11/1973 | Frisch et al. | 176/36 R |
| 3,853,699 | 12/1974 | Frisch et al. | 176/36 R |
| 3,977,939 | 8/1976 | Frisch et al. | 176/36 R |
| 3,992,255 | 10/1976 | DeWesse | 176/36 C |

FOREIGN PATENT DOCUMENTS 173371  11/1960  Sweden .................................. 176/36 C

*Primary Examiner*—Samuel W. Engle
*Assistant Examiner*—S. A. Cangialosi
*Attorney, Agent, or Firm*—Lane, Aitken & Ziems

[57] ABSTRACT

Refuelling of a nuclear reactor and especially a PWR is carried out in the steps which consist in removing and storing the reactor closure head, in moving the control rods from a bottom position to the top position and securing the rods to the upper internal structure, in removing and storing the assembly constituted by the upper internal structure and the control rods, in replacing the spent fuel and in re-positioning the upper internal structure and the closure head.

5 Claims, 6 Drawing Figures

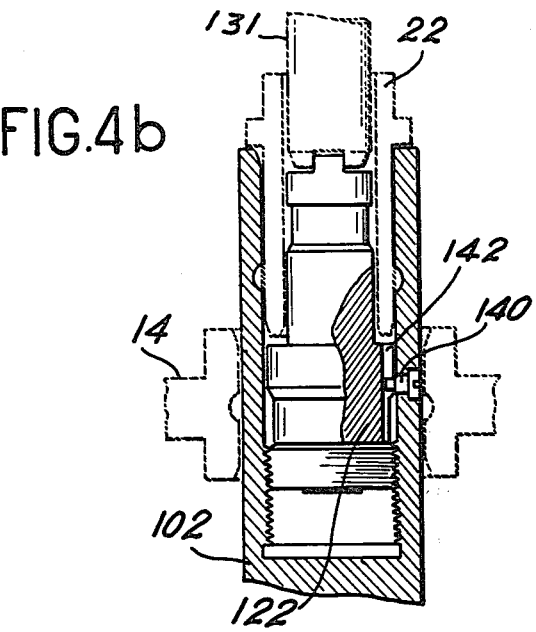
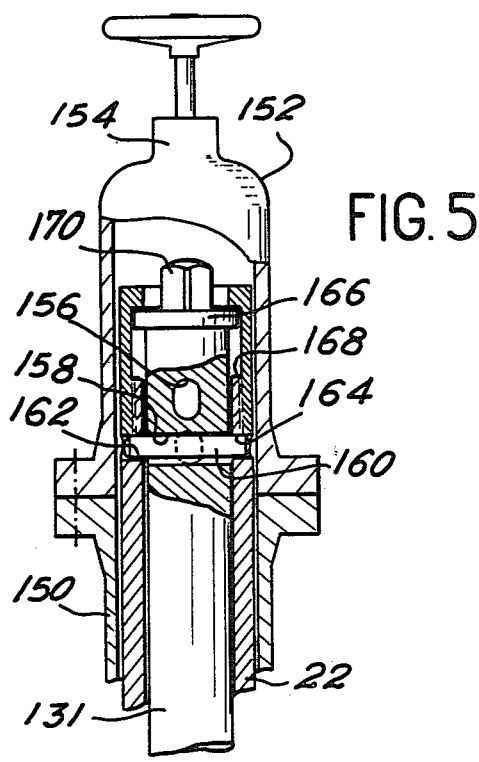

METHOD FOR REFUELLING A NUCLEAR REACTOR AND DEVICE FOR CARRYING OUT SAID METHOD

This is a continuation, of application Ser. No. 552,922 filed Feb. 25, 1975, now abandoned.

This invention relates to a method of refuelling of a nuclear reactor and to a device for carrying out said method. In more exact terms, the invention relates to an improvement in the refuelling of a nuclear reactor which permits more rapid handling operations.

It is known that a nuclear reactor core which serves as an energy source is constituted by fuel assemblies which are in turn constituted by an array of fuel elements of fissile material. During reactor operation, the fraction of uranium-235 contained in said fuel decreases. It is therefore necessary at intervals to replace the partly spent fuel by fresh fuel. Refuelling of the reactor core therefore consists on the one hand in removing the spent fuel and on the other hand in introducing fresh fuel into the reactor or in displacing a fuel element from one region of the reactor core to another.

In order to obtain a better understanding of the problems which arise at the moment of re-charging of a reactor with nuclear fuel, reference can be made to the accompanying FIG. 1 in which a pressurized water reactor (PWR) is shown diagrammatically in sectional elevation. The following description relates to the case of a PWR but it is readily apparent that the invention could apply just as readily to any type of reactor.

The pressurized water reactor essentially comprises a pressure vessel 2 which is closed at the top by a closure head assembly 4. The pressure vessel is pierced by apertures such as the nozzle 6 which are connected to ducts for circulating the coolant liquid within the pressure vessel 2. Provision is made within the vessel for a lower structure consisting essentially of a core barrel 8, the top portion of which is applied against an internal annular shoulder or support ledge 16 of the pressure vessel 2. By means of the lower core support plate 10, the bottom portion of the core barrel 8 supports the fuel assemblies such as those designated by the reference 12. Provision is also made within the pressure vessel 2 for a top internal structure which is constituted by the upper support plate 14 and the upper core plate 18, said plates being connected by the spacer members formed by the control rod guide tubes 20, the complete assembly being positioned by the upper plate 14 which rests on the support ledge 16 of the pressure vessel. The upper core plate 18 is essentially intended to prevent "levitation" of the fuel assemblies 12 under the action of the coolant which flows upwards through the reactor core. To this end, the upper portion of each fuel assembly 12 can be provided with an elastic system compressed by the upper core plate 18. Reactivity control is accomplished by means of neutron absorbers or control rods. A control rod is constituted by a drive shaft 22 slidably fitted within the control rod guide tubes 20 and adapted to carry absorber rods such as the rod 24 which are inserted into hollow tubes formed within the fuel assemblies 12. The upper end of each control rod drive shaft 22 traverses the closure head assembly 4 of the reactor through leak-tight thermal sleeves 26 and is connected to a control rod drive mechanism 28.

It is clear from this intentionally brief outline that, in order to refuel a nuclear reactor core or in other words to withdraw and replace the fuel assemblies in an unloading and reloading operation, it is necessary to remove the reactor closure head assembly 4, then the upper internal structure which is essentially constituted by the upper support plate 14 and the upper core plate 18 as well as the control rods and drive shafts.

All these operations are complex and time-consuming and obviously entail the need for reactor shutdown. It is therefore essential to simplify refuelling operations and to reduce the time required. This becomes a particularly important consideration if refuelling is to be performed several times a year.

French Pat. No. 71,24817 of July 7th, 1971 describes a method of refuelling a nuclear reactor which consists in removing in a single unit both the pressure vessel lid, the upper internal structure and the control rods, and in storing the complete assembly next to the reactor vessel. This system is attended by certain drawbacks in that means have to be provided for locking the control rod drive mechanisms in the top position and that both the upper internal structure and the control rod absorbers have to be stored with the reactor vessel lid or closure head. These two elements are radioactive, which does not facilitate inspection of the closure head assembly and control rod drive mechanisms.

The present invention is precisely directed to a method for refuelling a nuclear reactor and to a device for carrying out said method which overcomes the disadvantages mentioned in the foregoing. In particular, the method according to the invention permits separate removal of the reactor vessel closure head and the upper internal structure as well as the control rods.

The method of refuelling essentially comprises the following steps:

the reactor closure head is removed after having disengaged this latter from the control rods which are left in the bottom position and said closure head is then stored;

the control rods are brought to the top position and secured to the upper internal structure;

the assembly constituted by the upper internal structure and the control rods is removed and stored;

the spent fuel is replaced and the upper internal structure and the closure head are put back in position.

In an alternative mode of execution, the method comprises the following steps:

the control rods are brought to the top position and secured to the upper internal structure;

the reactor closure head is removed;

the assembly constituted by the control rods and the upper internal structure is removed and stored;

the spent fuel is replaced and the upper internal structure and the closure head are put back in position.

The invention further relates to an unloading device which essentially comprises a frame provided in the lower portion thereof with members for locking said frame on the upper internal structure and a moving platform which is capable of translational motion in a vertical direction with respect to said frame, said moving platform being provided with means for securing the upper extremities of the control rod drive shafts to said moving platform, said frame being provided with means for producing said movement of translation and guiding of said platform, the travel of the moving platform being substantially equal to the travel of the control rods within the reactor core.

In a preferred form of construction, the frame is provided at the lower end with a circular flange having an internal diameter at least equal to that of the circle which is circumscribed about all the control rod position locations, vertical columns which serve to guide the moving platform and are attached to said flange at the lower ends, said columns being attached at their upper ends to a second flange comprising means for displacing said platform in translational motion, said platform being provided with an aperture opposite to each control rod drive shaft, the end of each shaft being capable of penetrating into the corresponding aperture, a member for locking each drive shaft being associated with each aperture.

The invention is also concerned with a device for carrying out the alternative form of the method, said device being distinguished by the fact that the rigid structure comprises radial ribs fixed on an open-topped cylindrical canister, the wall of said canister being provided with bored recesses for accommodating a first series of balls which are capable of projecting from said canister and penetrating to a partial extent into notches formed in the so-called upper plate, that said drive shaft is hollow and provided at the lower end which penetrates into said canister with bored recesses for accommodating a second series of balls which are capable of projecting from said drive shaft so as to penetrate to a partial extent into notches formed in the internal wall of said canister, and that said device comprises movable means for causing alternate penetration of the balls of the first series into the corresponding notches so as to secure the absorber rods to said upper internal structure and the balls of the second series into the corresponding notches so as to secure said drive shaft to said canister.

Said movable means are preferably constituted by a sleeve whose lower portion is capable of sliding within the interior of said canister and whose upper portion is capable of sliding within the interior of the lower end of the drive shaft, and means for displacing said sleeve in vertical motion, the external profile of the upper portion and the lower portion of said sleeve being such that said portions perform a cam function which permits the alternate motion of said balls.

A better understanding of the invention will in any case be gained from the following description of one embodiment of the invention which is given by way of non-limitative example, reference being made to the accompanying drawings, wherein.

Figure 4A:
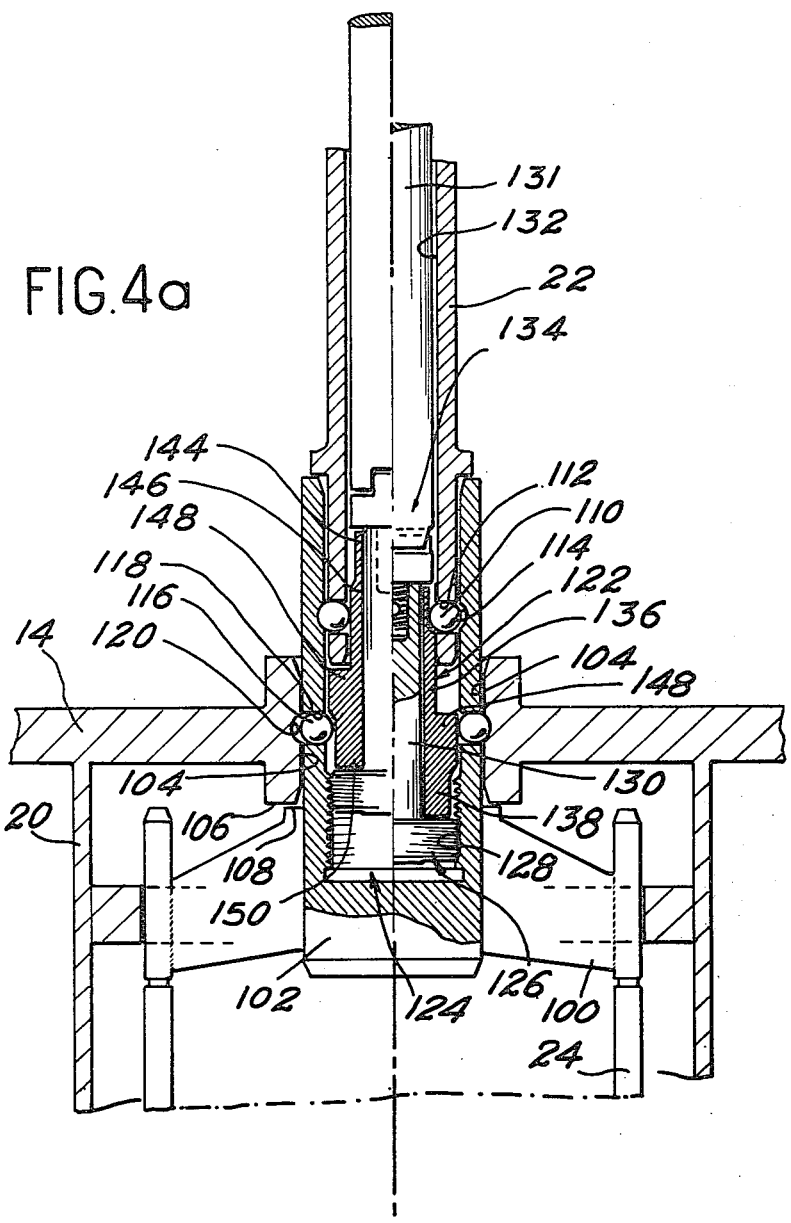

FIG. 4a comprises two vertical sectional half-views showing the connection between the control rod drive shaft, the absorber-rod cluster and the upper internal structure;

FIG. 4b is a detail view of FIG. 4a;

FIG. 5 shows one example of construction of the detachable connection between the drive shaft and the operating rod.

Figure 2:
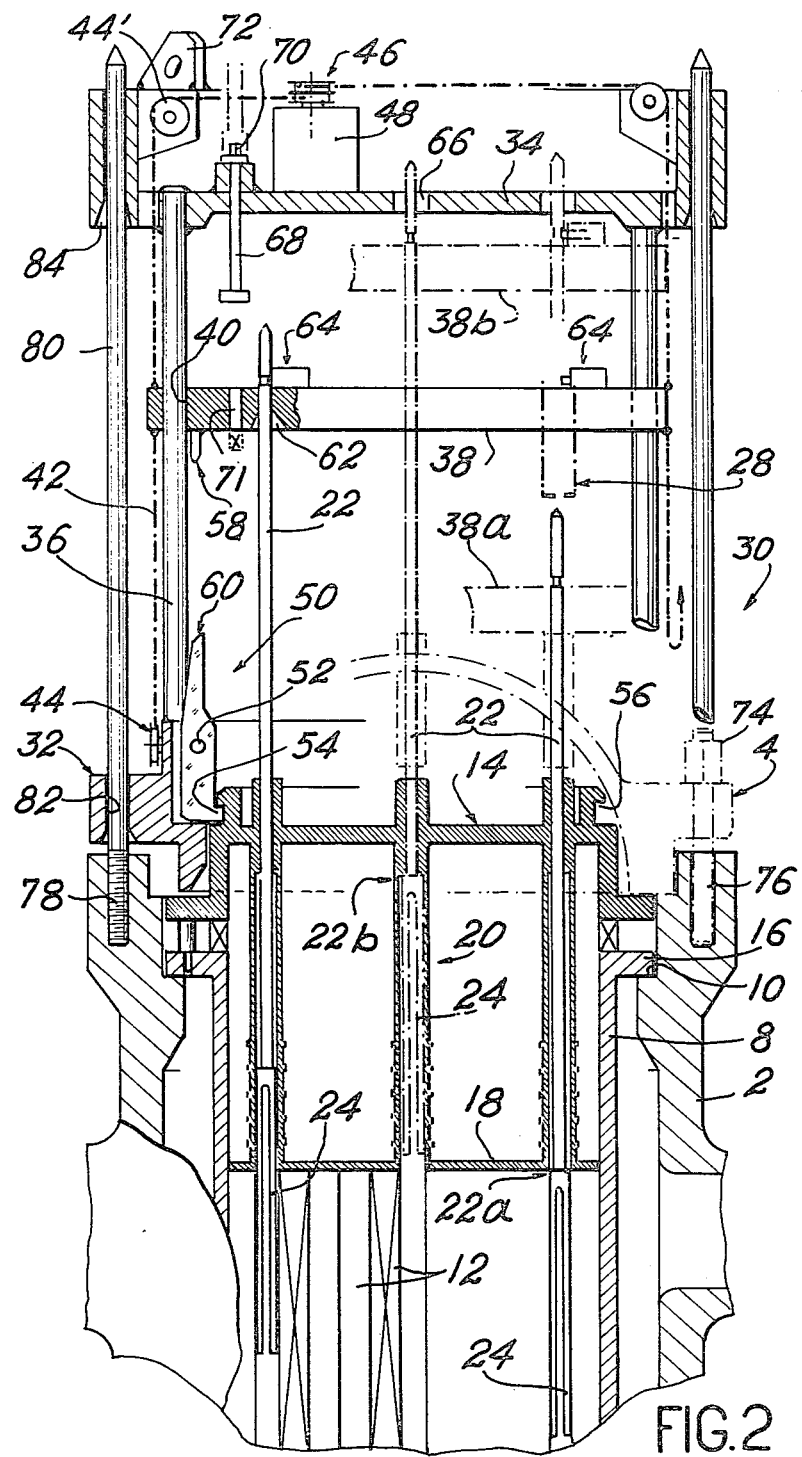
FIG. 2 is a sectional view in elevation showing the device for carrying out the method, this device being placed in position at the top portion of the reactor.

One particular form of construction of the refuelling device for carrying out the method according to the invention is shown in FIG. 2. For the sake of convenience of language, this device will be designated hereinafter as a removable assembly.

The removable assembly 30 comprises a stationary frame essentially constituted by a lower circular flange 32, a circular top plate 34, these two elements being connected by vertical columns having a circular cross-section such as the column 36. As will be explained below, this stationary portion of the removable assembly is locked on the upper internal structure of the reactor. The top plate 34 can simply be constituted by a second flange.

The removable assembly further comprises a portion which is capable of moving with respect to the stationary frame and consists essentially of a moving platform 38 pierced by peripheral bores such as 40 through which are passed the vertical columns such as 36. The platform 38 is thus capable of displacement in a vertical direction between a bottom position corresponding to the lower flange 32 and a top position corresponding to the stationary top plate 34 while being guided by the vertical columns 36. The movable assembly is clearly provided with means for displacing the moving platform 38 with respect to the stationary frame. By way of example, the means aforesaid can consist of chains such as 42 which are fixed on the moving platform 38 and passed over guide pulleys such as those designated by the references 44 and 44', said pulleys being secured to the stationary structure and driven by a pulley as designated by the reference 46 and coupled to the shaft of a motor 48 which is mounted on the top plate 34. It is clearly apparent that the means for initiating the displacement of the moving platform 38 are mentioned only by way of example and that many other driving systems such as cables, worms and the like could be devised.

The lower flange 32 of the removable assembly is provided with systems for locking said removable assembly on the upper internal structure of the reactor and more precisely on the upper support plate 14. By way of example, such locking elements can be constituted by a movable member 50 pivotally mounted on a pin 52 which is rigidly fixed to the flange 32. The lower end of said movable member has a lug 54 which is capable of penetrating into a corresponding annular recess 56 formed in the upper core support plate 14. The member 50 can be maintained in the engaged position (namely the position shown in FIG. 2) by means of restoring springs. Release of the lugs 54 is obtained for example when the moving platform 38 is in the bottom position by virtue of a stud 58 rigidly fixed to the moving platform 38 and adapted to cooperate with a ramp 60 formed on the top portion of the member 50. It clearly remains possible to employ any equivalent system for locking the removable assembly on the internal upper structure in order to ensure a high degree of operational safety.

The moving platform 38 is provided opposite to each control rod drive shaft 22 with a bore such as the bore 62 through which the upper end of each control rod drive shaft is permitted to pass. A device 64 for locking the drive shafts 22 on the moving platform 38 is associated with each bore 62. A particular example of construction of this locking system will be described hereinafter in connection with FIG. 3.

The top plate 34 of the removable assembly 30 is also provided with apertures 66 opposite to each control rod drive shaft and permits said control rods to pass there-through. The platform is further provided with members such as 68 adapted to cooperate with bores such as 71 formed in the moving platform 38 for locking said moving platform in the top position. Locking action is obtained for example by rotating the operating head 70 of the member 68 by means of a spanner. A locking system of this type could also be employed for securing the removable assembly 30 to the upper internal structure. Finally, the top plate 34 of the removable assembly 30 is provided with lifting lugs such as the lug 72.

Consideration will now be given to the different steps of the method as applied to the case of the particular device which has been described in the foregoing.

In a first step, the closure head 4 is removed by unscrewing the nuts 74 and removing the fixing studs 76. The control rod drive mechanisms are of course removed at the same time. Prior to this operation, the control rods are moved to the extreme bottom position or, in other words, the absorber pins of the control rods are fully inserted into the reactor core. This is the position in which the control rod 22a is shown in FIG. 2. Guide rods such as the rod 80 are engaged in the internally-threaded blind-end bores such as the bore 78 corresponding to the fixing studs 76. The removable assembly 30 is then placed in position and guided by the penetration of the guide rods 80 into the peripheral bores 82 and 84 which are formed respectively in the flange 32 and the top plate 34. The removable assembly 30 is locked on the upper core support plate 14 by means of the devices 50. The moving platform 38 is lowered to its extreme bottom position shown in chain-dotted lines at 38a. The heads of the control rod drive shafts project within the interior of the bores 62 of the moving platform (position of the drive shaft 22a). The drive shafts are locked on the moving platform by means of the devices 64. By means of the motor 48, the moving platform 38 is lifted to the position shown in chain-dotted lines at 38b. In this position, the absorber pins 26 are fully withdrawn from the fuel assemblies (position 22b of the control rod). The complete unit constituted by the removable assembly, the upper internal structure of the reactor vessel and the control rods is then removed. The unit is stored in the cooling pond in order to ensure protection against radioactive radiation by means of a sufficient depth of water. The fuel assemblies are then directly accessible for handling. Loading and reloading of fuel assemblies is then carried out, whereupon the assembly which was previously removed is re-positioned by carrying out the operations in the reverse order.

It is wholly apparent that all precautions are taken in order to prevent reactor power peaking in the event of any error made by the operator, in particular in the event that the boron content of the pond water were insufficient to prevent divergence at the time of withdrawal of the control rods. The main precaution to be adopted consists in ensuring a very low speed of upward motion of the moving platform 38 and therefore of the control rods. For example, a speed of the order of one millimeter per second is desirable. This represents a period of one hour of upward withdrawal of the control rods over the full range of travel. Moreover, neutron control means are mounted within the reactor core after removing the closure head. These means are in any case displaced into and out of the reactor core in exactly the same manner as the normal reactor instrumentation. The drive system for lifting the moving platform 38 is connected to these low-power neutron control means and the lifting motion is stopped as soon as an insufficient level of negative reactivity appears.

Figure 1:
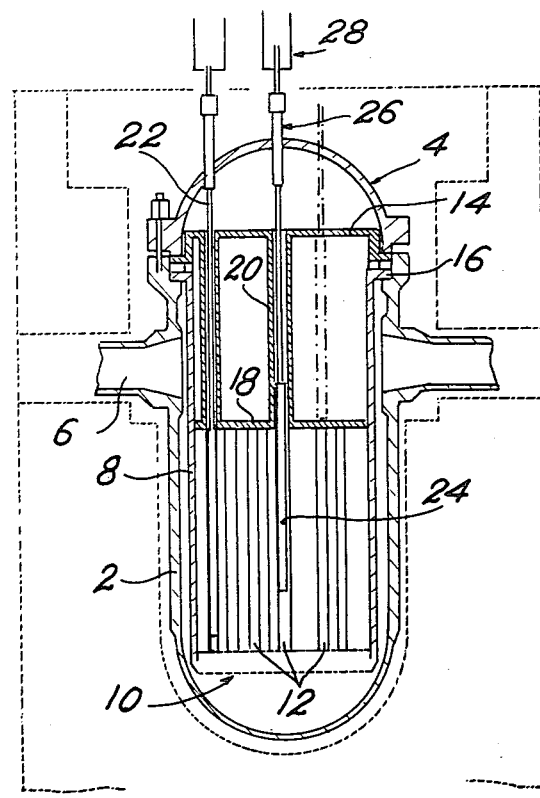
FIG. 1 is a diagrammatic sectional view in elevation showing a nuclear reactor of the pressurized-water type described earlier.
Figure 3:
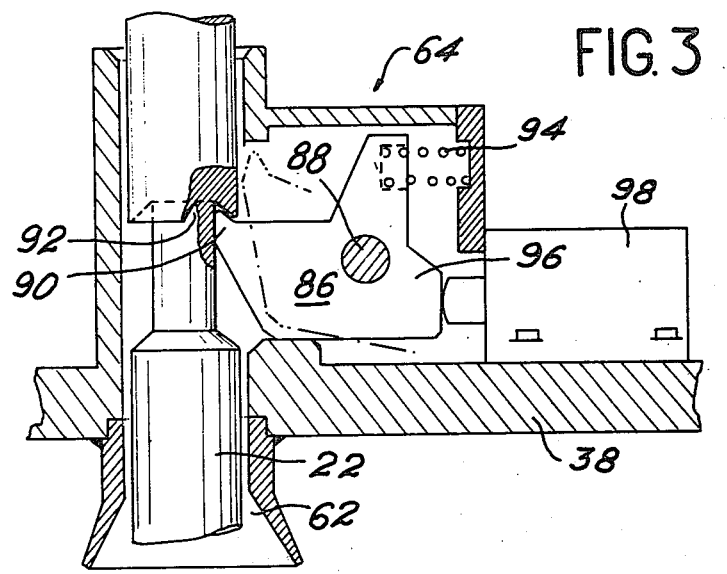
FIG. 3 is a sectional view of part of the device represented in FIG. 2 and showing the constructional detail of the means for locking the control rods on the intermediate structure.

There is shown in FIG. 3 one example of construction of the devices 64 for locking the heads of the control rod drive shafts on the moving platform 38. The locking device essentially comprises a member 86 which is capable of moving about a pivot-pin 88 rigidly fixed to the platform 38. The member 86 is provided at one end with a lug 90 and this latter is capable of penetrating into the annular recess 92 formed in the drive shaft 22. The member 86 is maintained in its locking position by means of the spring 94. Unlocking is obtained by the action produced on the heel-shaped projection 96 of the member 86 by the moving armature of the electromagnet 98. The platform 38 must clearly be lowered to a slight extent beforehand in order to initiate disengagement of the lug 90 from the recess 92.

It is readily apparent that the particular system described in the foregoing can be replaced by jaws closed by springs and opened by the action of hydraulic or pneumatic jacks, studs or catches of the pawl type which engage with the drive shafts under the action of springs and are disengaged by the same means as those referred-to above, or locking of the drive shafts on the moving platform by direct action of a magnetic field between the two elements as obtained by means of a permanent magnet or an electromagnet.

FIGS. 4a and 4b illustrate a device for providing a connection between an absorber-rod cluster and the corresponding drive shaft and between said cluster and the upper internal structure for carrying out the alternative form of the method.

The left-hand half-view illustrates the device in the position of reactor operation in which the drive shaft and the control rod cluster are coupled together whereas the cluster is free with respect to the upper internal structure. The right-hand half-view illustrates the device in the discharge or unloading position in which the drive shaft is disengaged from the cluster whereas said cluster is coupled with the upper internal structure. In both cases the control rod cluster is in the top position whilst the control rods or absorber pins are fully withdrawn from the reactor core.

The absorber pins 24 which correspond to a given fuel assembly are associated in a cluster by means of a so-called "spider" structure comprising radial ribs such as the rib 100, the absorber pins 24 being fixed at the ends of said ribs. The ribs 100 are rigidly fixed at the other end to a cylindrical canister 102. The entire control rod cluster is capable of displacement within the guide tube 20. The upper portion of the canister traverses the upper support plate 14 through the aperture 104. At the end of travel, the top shoulders 106 of the radial ribs 100 are abuttingly applied against the bottom face 108 of the collar which surrounds the aperture 104.

The connection between the drive shaft 22 and the canister 102 is obtained by means of a plurality of balls such as the ball 110 which cooperate with the bored recesses 112 formed in the shaft 22 and are capable of penetrating into corresponding notches 114 formed in the internal face of the canister 102.

Similarly the connection between the canister 102 and the upper support plate 14 is obtained by means of a plurality of balls such as the ball 116 which cooperate with the bored recesses 118 formed in the wall of the canister 102 and are capable of penetrating into corresponding notches 120 formed in the internal face of the collar which surrounds the aperture 104.

Engagement or disengagement of the balls 116 and 110 is obtained by means of a sleeve 122 which is coaxial with the canister 102. The sleeve 122 is capable of displacement in a vertical direction under the action of an externally-threaded component 124, the threaded portion 126 of which cooperates with a threaded portion 128 machined in the internal face of the canister 102. The externally-threaded component 124 is rigidly fixed to a shaft 130.

The movements of rotation of the threaded component 124 are controlled by an operating-rod 131 which is capable of moving vertically within the central bore 132 of the control rod drive shaft 22. The operating-rod 131 is provided at its lower end with a member 134 which is capable of engaging within a blind-end bore 136 formed in the shaft 130. The threaded component 124 and the operating-rod 131 are thus rigidly coupled for rotational motion but not for translational motion.

The sleeve 122 has a first portion 136 of small external diameter which penetrates to a partial extent into the bore 132 of the drive shaft 22 and a second portion 138 of larger external diameter which is slidably fitted within the canister 102.

As can be seen from FIG. 4b, the sleeve 122 is secured against rotation by means of a stud 140 which is rigidly fixed to the canister 102 and cooperates with a groove 142 formed in the sleeve 122.

The portion 136 of the sleeve 122 performs a cam function for the balls 110. This portion comprises a top part 144 of small diameter and a bottom part 146 of larger diameter which are connected to each other by means of a frusto-conical face. Similarly, the portion 138 of the sleeve 122 performs a cam function for the balls 116. This portion comprises a top part 148 of large diameter and a bottom part 150 of smaller diameter.

It will be understood that, when the sleeve 122 is in the top position (left-hand half-view), the bottom part 146 thrusts back the balls 110 which move partly into position within the notches 114 whereas the bottom part 150 permits the balls 116 to move out of the notches 118. There is therefore a connection between the absorber rods 24 and the drive shaft 22 whereas any connection with the upper support plate 14 is broken. The reactor control rod unit is therefore in the operating position. On the contrary, when the sleeve 122 is in the bottom position (right-hand half-view), the top part 144 permits the balls 110 to leave the notches 114 whereas the top part 148 thrusts back the balls 116 which move partly into position within the notches 120. There is therefore a connection between the absorber rods 24 and the upper support plate 14 whereas the connection is broken between the drive shaft 22 and the canister 102.

In order to ensure operational safety, it is necessary to lock the operating-rod 131 in position with respect to the drive shaft 22. This device is provided at the upper end of these two components above the drive mechanisms 28. The connecting members are illustrated in FIG. 4. The drive shaft is capable of sliding within a guide sleeve 150, a head-piece 152 being removably fixed on the end of said sleeve and provided with a vent 154. The end of the operating-rod 131 is provided with two perpendicular bores 156 and 158 respectively. These bores are intended to receive a key 160 (shown within the bore 158), the extremities of which penetrate into two (162 and 164) out of four holes which are uniformly spaced and pierced in the drive shaft 22. Depending on the bore in which the key 160 is inserted, the operating-rod 131 is coupled with the drive shaft 22 either in the top position or in the bottom position.

The extremity of the operating-rod has a shouldered portion 166 which is capable of coming into contact with the abutment 168, thus facilitating the introduction of the key 160 into the bore 156. The extremity of said operating-rod is also provided with a square operating nut 170.

It has been noted that the sleeve 122 is in the top position during normal reactor operation. The threaded component 124 is therefore also in the top position and the key 160 is introduced into the bore 158 as in FIG. 4.

When it is desired to carry out refuelling operations in the manner explained earlier, the control rods are moved to the top position; the absorber pins are secured to the top plate of the upper internal structure, and disengaged from the drive shafts; the closure head is removed together with the drive shafts; one then removes the upper internal structure on which the absorber pins are fixed and refuelling of the reactor core is then carried out.

In order to perform the first operations, the procedure is as follows:

The head-piece 152 is removed and the key 160 is withdrawn from the bore 158. By means of a hand tool applied to the square operating nut 170, the operating-rod 131 is displaced in pivotal motion, thus initiating the rotation of the threaded component 124 and lowering this latter. The resultant downward displacement of the sleeve 122 disengages the drive shaft 22 from the canister 102 and on the contrary couples the absorber rods with the support plate 14 of the upper internal structure. The closure head can then be removed together with the operating-rods 131 followed by the upper internal structure together with the absorber rods. The reactor core is then accessible for the refuelling operations proper.

What we claim is:

1. A device for refuelling a nuclear reactor, comprising a pressure vessel having a top closure head with a core constituted by a plurality of vertical fuel assemblies an upper internal structure above said reactor core comprising at least one top plate whose periphery rests on a support ledge of said pressure vessel, a plurality of hollow vertical guide tubes in which the control rods are slidably fitted, each control rod being constituted by a plurality of absorber pins coupled by a rigid structure to the lower end of a drive shaft, said shaft being adapted to traverse the top plate aforesaid through an aperture formed opposite to each guide tube and said closure head, a cylindrical canister open at the upper end cemented to said rigid structure, radial ribs fixed on said canister, the wall of said canister being provided with bored recesses for normally accommodating a first series of balls which are capable of projecting from said canister and penetrating to a partial extent into first cooperating notches formed in the top plate aforesaid, wherein said drive shaft is hollow and provided at the lower end which penetrates into said canister with bored recesses for normally accommodating a second series of balls which are capable of projecting from said drive shaft so as to penetrate to a partial extent into second cooperating notches formed in the internal wall of said canister, and wherein said device comprises a movable member with cam means thereon for selectively engaging the balls of the first and second series, one series at a time, for causing alternate penetration of the balls of the first series into the first cooperating notches so as to couple the absorber pins with said upper internal structure and the balls of the second series into the second cooperating notches so as to couple said drive shaft with said canister, whereby when engagement of the cam means is shifted from one series of balls to the other penetration of the engaged balls into their cooperating notches will simultaneously take place with accommodation of the non-engaged balls into their bored recesses.

2. A device according to claim 1, wherein said movable member is constituted by a sleeve whose lower portion is capable of sliding within the interior of said canister and whose upper portion is capable of sliding within the interior of the lower end of the drive shaft, and means for displacing said sleeve in vertical motion, the external profile of the upper portion and the lower portion of said sleeve being such that said portions perform a cam function which permits the alternate motion of said balls.

3. A device according to claim 2, wherein said vertical displacement means are constituted by a vertical operating-rod which is capable of sliding and rotating within the interior of the hollow drive shaft and by a threaded component adapted to cooperate with a threaded portion formed in the lower portion of said canister, the lower end of said sleeve being supported on the top face of the threaded component, said component being coupled for rotation to the lower end of said operating-rod.

4. A method for refuelling a nuclear reactor of the type comprising a pressure vessel having a closure head and an upper internal structure which surmounts the reactor core and contains a plurality of apertures in the tope plate thereof, a plurality of control rods, each of which includes a plurality of absorber pins coupled by a rigid structure to the lower end of a drive shaft which is adapted to traverse said top plate through one of said apertures, the method comprising the following steps:

(a) moving the control rods upward, (b) moving a movable member with first and second cam means for simultaneously: (1) remotely securing the absorber rods to the upper internal structure by engaging the first cam means with a first series of balls, located in bored recesses in an open-topped cylindrical canister connected to said rigid structure, so that said first series of balls will move and penetrate to a partial extent into cooperating notches in said top plate, and (2) disconnecting the drive shaft from the absorber rods by engaging the second cam means with a second series of balls, located in bored recesses in said drive shaft and which penetrate to a partial extent into cooperating notches formed in the internal wall of said canister, so that said second series of balls will withdraw from said notches in the internal wall of the canister, (c) removing the reactor closure head with drive shaft independent of the absorber rods and upper internal structure, (d) removing and storing the assembly constituted by the control rods and the upper internal structure, (e) replacing the spent fuel, and (f) returning the upper internal structure and the closure head to their initial positions.

5. A method for refuelling a nuclear reactor of the type comprising a pressure vessel having a closure head, an upper internal structure which surmounts the reactor core and includes a top plate, a plurality of guides in the top plate, a plurality of control rods, each of which includes a plurality of absorber pins releasably coupled by a rigid structure to the lower end of a drive shaft which is adapted to traverse said top plate through one of said guides, the method comprising the following steps:

(a) raising the control rols by moving the drive shafts upward, (b) while the closure head is in place, moving the drive shaft for simultaneously remotely (1) securing the rigid structure to the upper internal structure and (2) disconnecting the drive shaft from the rigid structure, the rigid structure, on the one hand, and the drive shaft and upper internal structure, on the other hand, having at least two cooperating connecting means located and shaped so that movement of the drive shaft from above the closure head will simultaneously perform steps (1) and (2), (c) removing the reactor closure head with the drive shaft independent of the absorber rods and upper internal structure, (d) removing and storing the assembly constituted by the control rods and the upper internal structure, (e) replacing the spent fuel, and (f) returning the upper internal structure and the closure head to their initial positions.

* * * * *